US010911481B2

United States Patent
Manadhata et al.

(10) Patent No.: US 10,911,481 B2
(45) Date of Patent: Feb. 2, 2021

(54) MALWARE-INFECTED DEVICE IDENTIFICATIONS

(71) Applicant: EntIT Software LLC, Sunnyvale, CA (US)

(72) Inventors: Pratyusa K. Manadhata, Piscataway, NJ (US); Kyle Williams, Saratoga, CA (US); Barak Raz, Sunnyvale, CA (US); Martin Arlitt, Calgary (CA)

(73) Assignee: MICRO FOCUS LLC, Santa Clara, CA (US)

( * ) Notice: Subject to any disclaimer, the term of this patent is extended or adjusted under 35 U.S.C. 154(b) by 223 days.

(21) Appl. No.: 15/884,988

(22) Filed: Jan. 31, 2018

(65) Prior Publication Data
US 2019/0238562 A1 Aug. 1, 2019

(51) Int. Cl.
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| G06F 21/56 | (2013.01) |
| H04L 29/12 | (2006.01) |
| G06F 40/10 | (2020.01) |

(52) U.S. Cl.
CPC .......... H04L 63/145 (2013.01); G06F 21/56 (2013.01); G06F 40/10 (2020.01); H04L 61/1511 (2013.01); H04L 63/101 (2013.01); H04L 63/1425 (2013.01); H04L 2463/144 (2013.01)

(58) Field of Classification Search
CPC ............ H04L 63/145; H04L 2463/144; H04L 61/1511; G06F 21/56
See application file for complete search history.

(56) References Cited

U.S. PATENT DOCUMENTS

| 8,260,914 B1 * | 9/2012 | Ranjan ................ H04L 61/1511 709/224 |
| 9,245,121 B1 * | 1/2016 | Luo ...................... H04L 63/1408 |
| 9,479,524 B1 | 10/2016 | Hagen |
| 9,516,039 B1 | 12/2016 | Yen et al. |
| 9,516,058 B2 | 12/2016 | Antonakakis et al. |
| 9,602,525 B2 | 3/2017 | Qian et al. |
| 9,686,291 B2 | 6/2017 | Antonakakis et al. |
| 9,756,063 B1 | 9/2017 | Chung |
| 9,781,139 B2 | 10/2017 | Sofka et al. |
| 9,979,748 B2 | 5/2018 | O'Connor |

(Continued)

FOREIGN PATENT DOCUMENTS

| CN | 105024969 A | 11/2015 |
| CN | 106911717 A | 6/2017 |

(Continued)

OTHER PUBLICATIONS

Fawcett, T., An introduction to ROC analysis, pp. 861-874. (Year: 2005).*

(Continued)

*Primary Examiner* — Trong H Nguyen (57) ABSTRACT

In some examples, for a device that transmitted domain names, a system determines a dissimilarity between the domain names, compares a value derived from the determined dissimilarity to a threshold, and identifies the device as malware infected in response to the comparing.

20 Claims, 6 Drawing Sheets

(56) References Cited

U.S. PATENT DOCUMENTS

| | | | |
|---|---|---|---|
| 10,075,458 | B2 | 9/2018 | Baughman et al. |
| 10,498,753 | B1 | 12/2019 | Pope |
| 2012/0054860 | A1 | 3/2012 | Wyschogrod |
| 2014/0082726 | A1 | 3/2014 | Dreller |
| 2014/0230054 | A1* | 8/2014 | Dinerstein .............. H04L 63/14 726/22 |
| 2015/0341379 | A1 | 11/2015 | Lefebvre |
| 2016/0065534 | A1 | 3/2016 | Liu et al. |
| 2016/0255107 | A1* | 9/2016 | Qian ................... H04L 63/1425 726/23 |
| 2016/0294852 | A1* | 10/2016 | Hagen ................. H04L 63/1425 |
| 2016/0337391 | A1 | 11/2016 | McKinney |
| 2016/0352679 | A1 | 12/2016 | Josiah et al. |
| 2016/0352772 | A1 | 12/2016 | O'Connor |
| 2017/0155667 | A1 | 6/2017 | Sobel |
| 2017/0295196 | A1 | 10/2017 | Arnell et al. |
| 2017/0324757 | A1* | 11/2017 | Al-Shaer ............. H04L 63/1433 |
| 2017/0346855 | A1 | 11/2017 | Reddy |
| 2018/0124020 | A1* | 5/2018 | Rodriguez .......... H04L 63/0281 |
| 2018/0176232 | A1* | 6/2018 | Rodriguez ............ H04L 63/145 |
| 2018/0234434 | A1 | 8/2018 | Viljoen |
| 2018/0343272 | A1 | 11/2018 | Khalil et al. |
| 2019/0052650 | A1* | 2/2019 | Hu ....................... H04L 63/1408 |
| 2019/0068555 | A1 | 2/2019 | Tsirkin |
| 2019/0141067 | A1 | 5/2019 | Rodriguez et al. |

FOREIGN PATENT DOCUMENTS

| | | |
|---|---|---|
| CN | 109450842 | 3/2019 |
| WO | WO-2017030569 A1 | 2/2017 |

OTHER PUBLICATIONS

Manadhata et al., U.S. Appl. No. 15/884,978 entitled Indicating Malware Generated Domain Names Using N-Grams filed Jan. 31, 2018 (30 pages).

Manadhata et al., U.S. Appl. No. 15/884,983 entitled Indicating Malware Generated Domain Names Using Digits filed Jan. 31, 2018 (30 pages).

Ahluwalia et al., Detecting Broad Length Algorithmically Generated Domains, Oct. 11, 2017, https://link.springer.com/chapter/10.1007/978-3-319-69155-8_2 (16 pages).

Antonakakis et al., From Throw-Away Traffic to Bots: Detecting the Rise of DGA-Based Malware, 2012 (16 pages).

Ashraf Abu-Alia, Detecting Domain Flux Botnet using Machine Learning Techniques, Feb. 2015 http://qspace.qu.edu.qa/bitstream/handle/10576/3279/Abu-Alia%2C%20Ashraf.pdf?sequence=4&isAllowed=y (104 pages).

Darling et al., A Lexical Approach for Classifying Malicious URLs, 2015, http://ieeexplore.ieee.org/abstract/document/7237040/ (8 pages).

Fu et al., Abstract Only, Stealthy Domain Generation Algorithms, Feb. 13, 2017 http://ieeexplore.ieee.org/document/7852496/ (5 pages).

HP ArcSight DNS Malware Analytics, Datasheet, Aug. 2015 (2 pages).

Martin Boasson Nordby, Security Incident Detection with Passive DNS Logs, May 2, 2014 https://www.duo.uio.no/bitstream/handle/10852/42055/Nordby-Master.pdf?sequence=29 (84 pages).

Mowbray et al., Finding Domain-Generation Algorithms by Looking at Length Distributions, 2014, https://pdfs.semanticscholar.org/bc12/34d57c2bfae6bcc6a8f1f1743ba42b8317ed.pdf (6 pages).

OSINT Feeds From Bambenek Consulting, Master Feeds downloaded Jan. 3, 2018, http://osint.bambenekconsulting.com/feeds/ (3 pages).

Plohmann et al., A Comprehensive Measurement Study of Domain Generating Malware, Proceedings of the 25th USENIX Security Symposium, Aug. 2016 (17 pages).

Schiavoni et al., Phoenix: DGA-based Botnet Tracking and Intelligence , 2014 (20 pages).

Wang et al., Breaking Bad: Detecting Malicious Domains Using Word Segmentation, Jun. 2015 https://arxiv.org/pdf/1506.04111.pdf (7 pages).

Wikipedia, Botnet last edited Dec. 22, 2017 (8 pages).

Wikipedia, Edit distance last edited Dec. 29, 2017 (5 pages).

Wikipedia, Levenshtein distance last edited Jan. 6, 2018 (8 pages).

Woodbridge et al., Predicting Domain Generation Algorithms with Long Short-Term Memory Networks, Nov. 2, 2016, http://www.covert.io/research-papers/deep-learning-security/Predicting%20Domain%20Generation%20Algorithms%20with%20Long%20Short-Term%20Memory%20Networks.pdf (13 pages).

Yadav et al., Detecting Algorithmically Generated Malicious Domain Names, Nov. 1-3, 2010, http://citeseerx.ist.psu.edu/viewdoc/download?doi=10.1.1.221.1167&rep=rep1&type=pdf (14 pages).

Agyepong et al; Detection of Algorithmically-Generated Malicious Domain Using Frequency Analysis; https://www.academia.edu/37302436/DETECTION_OF_ALGORITHMICALLY-_GENERATED_MALICIOUS_DOMAIN_USING_FREQUENCY_ANALYSIS; 21 pages; Jun. 2018.

Anonymous, "Character level based detection of DGA Domain names", ICLR 2018, 11 pages.

Feng Zeng, et al., "Classification for DGA-based malicious domain names with deep learning architectures", International Journal of Intelligent Information System. vol. 6, No. 6, 2017, pp. 67-71.

Koh et al., "Inline Detection of Domain Generation Algorithms with Context-Sensitive Word Embeddings", Optfit LLC, Denver, Colorado; Georgia Institute of Technology, Atlanta, Georgia, Nov. 21, 2018, https://www.researchgate.net/publication/330632552_Inline_Detection_of_Domain_Generation_Algorithms_with_Context-Sensitive_Word_Embeddings.

Quan Le, et al., "Deep learning at the shallow end—Malware Classification for non-Domain Experts", Digital Investigation, vol. 26, Supplement, Jul. 2018, pp. S118-S126.).

Shi et al., "Malicious Domain Name Detection Based on Extreme Machine Learning", School of Electronic Information and Electrical Engineering, Shanghai Jiao Tong University, Pe.

Yanchen Qiao, et al., "DGA Domain name classification method based on long short term memory with attention mechanism", Applied Sciences, MDPI, Oct. 9, 2019, 14 pages.

Zhao et al., "Malicious Domain Names Detection Algorithm Based on N-Gram", School of Computer and Communication, Lanzhou University of Technology, China; Department of Mathema.

Zhauniarovich, et al; A Survey on Malicious Domains Detection through DNS Data Analysis; https://dl.acm.org/citation.cfm?doid=3236632.3191329; 3 pages; Sep. 2018.

Manadhata et al., U.S. Appl. No. 16/709,637 entitled Classifying Domain Names Based on Character Embedding and Deep Learning, filed Dec. 10, 2019, (48 pages).

Manadhata et al., U.S. Appl. No. 16/433,151 entitled Determining Whether Domain Is Benign or Malicious filed Jun. 6, 2019 (66 pages).

Shi et al., "Malicious Domain Name Detection Based on Extreme Machine Learning", School of Electronic Information and Electrical Engineering, Shanghai Jiao Tong University, People's Republic of China, Jul. 3, 2017, https://link.springer.com/article/10.1007/s11063-017-9666-7.

Zhao et al., "Malicious Domain Names Detection Algorithm Based on N-Gram", School of Computer and Communication, Lanzhou University of Technology, China; Department of Mathematics and Computer Science, Fort Valley State University, USA, Nov. 21, 2018, https://www.hindawi.com/journals/jcnc/2019/4612474/.

* cited by examiner

MALWARE-INFECTED DEVICE IDENTIFICATIONS

BACKGROUND

A piece of malware can infect a system, where the malware can perform various malicious activities. In some cases, once the malware infects a system, the malware can establish communication with a remote server that can be referred to as a Command and Control (C2) server. The C2 server can then send instructions to the malware to perform respective malicious activities.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A Domain Name System (DNS) is a component of a network that translates human-friendly domain names into computer-useable network addresses, such as Internet Protocol (IP) addresses. For example, when a user types "microfocus.com" into a web browser on an electronic device, the electronic device may not know where the web server that hosts "microfocus.com" is located. The electronic device can send a DNS query to a DNS server (or multiple DNS servers) to obtain the web server's network address, such as an IP address.

DNS can be exploited by malware code to attack a network (such as a denial-of-service attack), to steal stored information, to transmit spam or ransomware, or to perform other malicious activities. Once a malware code infects an electronic device, the malware code may first attempt to establish communication with a Command and Control (C2) server that is outside of a network to which the infected electronic device is attached. Once communication is established with the C2 server, the infected electronic device (or multiple infected electronic devices) can receive instructions to perform malicious activities from a botmaster that operates the C2 server. The botmaster can be a human, a program, or a machine. A group of infected electronic devices that are remotely controlled by the same botmaster via a C2 server can be referred to as a "botnet."

In some cases, a malware code can contact a C2 server by using an IP address from a hard-coded list of IP addresses and/or domains. However, once an instance of the malware code is detected and analyzed by anti-malware tools, the IP addresses used by the malware code can be blacklisted or sinkholed, which kills the botnet by blocking communications between C2 servers and bots (instances of the malware code).

In other cases, malware code can use Domain Generation Algorithms (DGAs) to establish communications with C2 servers. A DGA can use a starting value, called a "seed," to pseudo-randomly generate a list of domain names. When an electronic device is infected by a DGA-based malware code, the DGA-based malware code can use the seed (e.g., a current date or other value) to generate a list of domain names, which can include tens to tens-of-thousands (or more) domain names. The C2 server can generate the same list of domain names, but picks only one (or a subset) to register with a DNS server (or multiple DNS servers). The DGA-based malware code can go through the list of domain names and send DNS queries for each domain name, one-by-one, until one of the domain names resolves to an IP address. If a given domain name being used by a botnet gets blacklisted or taken down, the botmaster can simply move to the next domain name on the list.

In order to avoid collisions with other malware families, a malware family can use a DGA that is different from the DGAs used by the other malware families. A "malware family" refers to a family that includes a particular botmaster, C2 server(s), and DGA-based malware code that can interact with the C2 server(s) of the family. Some DGAs select letters and numbers with equal probabilities, producing domain names like "bqwqeiswupyny.org." Other DGAs simply use hash outputs, producing domain names like "5d19cbf688d4.com."

It can be difficult to reliably distinguish between benign domain names and malicious domain names (also referred to as DGA domain names) used by botnets. Some techniques may identify benign domain names as malicious at a high rate—such techniques are referred to as techniques with high false positive rates in identifying domain names as malicious. Other techniques may fail to identify malicious domain names as malicious—such techniques are referred to as techniques with low true positive rates in identifying domain names as malicious.

In addition, it can be difficult to reliably identify malware-infected devices that transmit DGA domain names. In accordance with some implementations of the present disclosure, a system can, for a device that transmitted domain names, determine a dissimilarity between the domain names, compare a value derived from the determined dissimilarity to a threshold, and identify the device as malware infected in response to the comparing.

Figure 1:
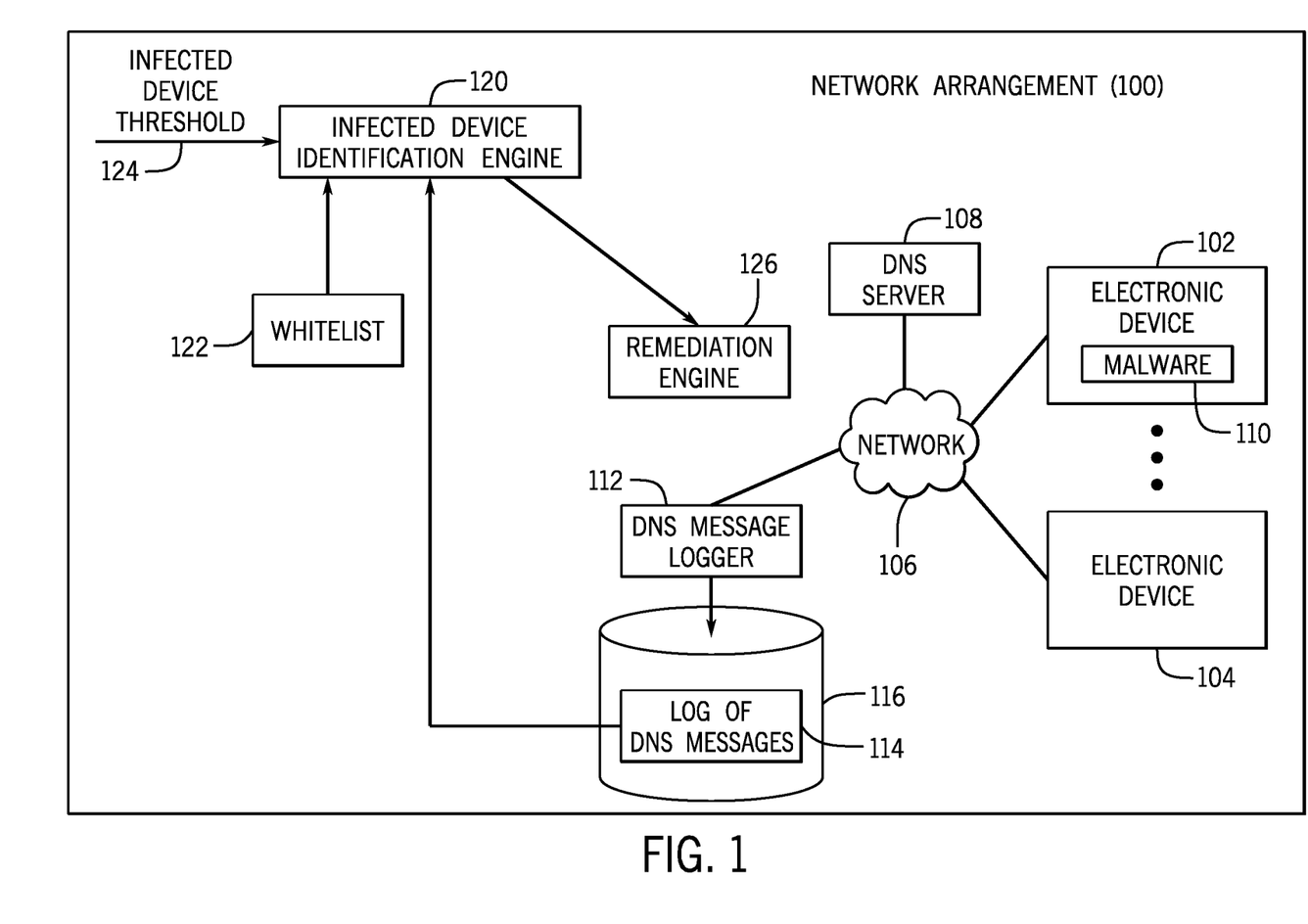
FIG. 1 is a block diagram of an arrangement that includes an infected device identification engine, according to some examples.

FIG. 1 is a block diagram of an example network arrangement 100 that includes various electronic devices 102 and 104 that are coupled over a network 106. The network arrangement 100 may be operated by an enterprise (or multiple enterprises), where an "enterprise" may refer to a company, an educational organization, a government agency, an individual, or any other entity.

Although just two electronic devices 102 and 104 are shown in FIG. 1, it is noted that in other examples, the network arrangement 100 can include a larger number of electronic devices that can communicate over the network 106. Examples of electronic devices can include any or some combination of the following: a desktop computer, a notebook computer, a tablet computer, a smartphone, a wearable device (e.g., a smart watch, smart eyeglasses, a head-mounted device, etc.), a game appliance, a server computer, a storage server, a communication node (e.g., a switch, a router, etc.), or any other electronic device.

The network 106 can be a wired network and/or a wireless network. A DNS server 108 is coupled to the network 106. Each electronic device 102 or 104 is able to submit a DNS query to the DNS server 108, where the DNS query includes a domain name. Although just one DNS server 108 is depicted in FIG. 1, it is noted that in other examples, there can be multiple DNS servers in the network arrangement 100. Moreover, it is noted that in some cases, a DNS server can be located outside the network arrangement 100. For example, the network 106 of the network arrangement 100 can be a local area network (LAN) or wide area network (WAN) that belongs to a specific enterprise. Devices in the network arrangement 100 are able to communicate with a public network, such as the Internet, that is outside of the network arrangement 100. A DNS server (or multiple DNS servers) can be coupled to the public network, and an electronic device in the network arrangement 100 is able to issue a DNS query to the DNS server(s) that is outside of the network arrangement 100.

In response to a DNS query that includes a given domain name, the DNS server 108 can access mapping information that maps domain names to respective network addresses, such as IP addresses. The network address(es) mapped to the given domain name can be returned by the DNS server 108 in a DNS response back to the electronic device that submitted the DNS query. The electronic device can then use the network address(es) to establish a communication with a destination at the network address received from the DNS server 108.

In the example of FIG. 1, it is assumed that the electronic device 102 has been infected with a malware code 110, while the electronic device 104 has not been infected with a malware code. In some examples, the malware code 110 can use DGA to produce pseudo-randomly generated domain names (referred to as "DGA domain names") that are submitted in corresponding DNS queries to the DNS server 108 (or to multiple DNS servers). In contrast, a DNS query submitted by the electronic device 104 includes a benign domain name, i.e., a domain name that is not produced using any DGA.

As further depicted in FIG. 1, a DNS message logger 112 can log DNS messages (e.g., DNS queries and/or DNS replies) communicated over the network 106. In some examples, the DNS message logger 112 can be part of the DNS server 108, or alternatively, can be separate from the DNS server 108. The DNS message logger 112 can log detected DNS messages into a log of DNS messages 114, which can be stored in a storage medium 116. This storage medium 116 can be implemented using a storage device or alternatively, multiple storage devices.

Generally, a "DNS message" can include a DNS query, a DNS reply (to a DNS query), as well as any other type of message that is communicated for looking up a network address corresponding to a domain name.

The DNS message logger 112 can be implemented as a hardware processing circuit, which can include any one or some combination of the following: a microprocessor, a core of a multi-core microprocessor, a microcontroller, a programmable integrated circuit, a programmable gate array, or any other hardware processing circuit. Alternatively, the DNS message logger 112 can be implemented as a combination of a hardware processing circuit and machine-readable instructions (software and/or firmware) executable on the hardware processing circuit.

An infected device identification engine 120 can process domain names in the DNS messages of the log of DNS messages 114 to determine whether or not an electronic device is malware-infected. As used here, an "engine" can refer to a hardware processing circuit, or alternatively, an "engine" can refer to a combination of a hardware processing circuit and machine-readable instructions executable on the hardware processing circuit.

In other examples, instead of processing DNS messages from the log of DNS messages 114, the infected device identification engine 120 can instead process each DNS message as the DNS message is communicated over the network 106 and detected by the infected device identification engine 120. In such examples, the DNS message logger 112 can be omitted.

Figure 2:
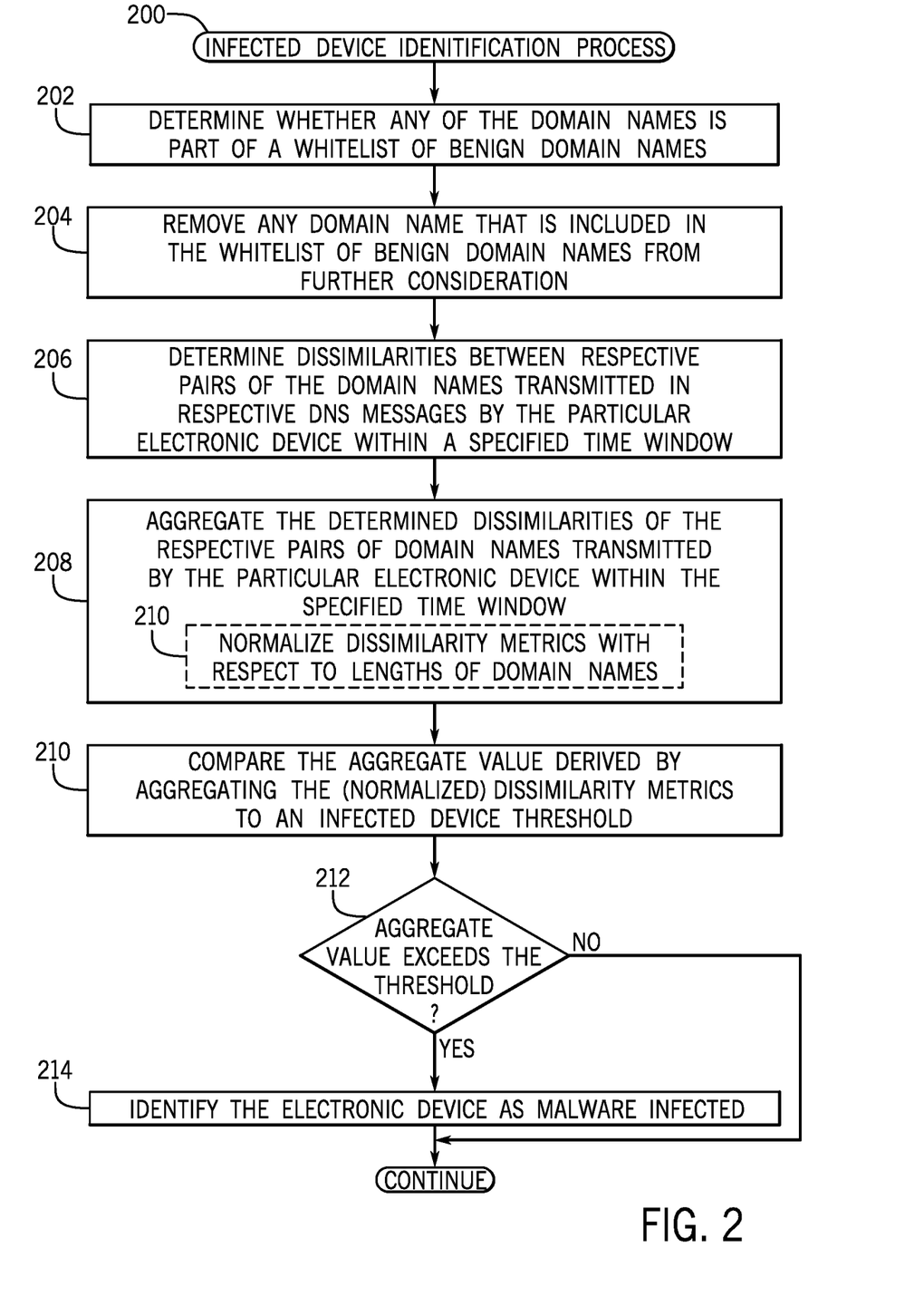
FIGS. 2 and 3 are flow diagrams of infected device identification processes according to various examples.

The infected device identification engine 120 identifies a particular electronic device (e.g., 102 or 104) that has transmitted DNS messages containing domain names. For the particular device that transmitted domain names, the infected device identification engine 120 can perform an infected device identification process 200 as depicted in FIG. 2.

The infected device identification engine 120 determines (at 202) whether any of the domain names is part of a whitelist of (known) benign domain names 122. The whitelist of benign domain names 122 can refer to any data collection of domain names. The benign domain names included in the whitelist 122 are domain names that have been identified to not be DGA generated, based on historical data or based on expertise or knowledge of an entity, including a human, a machine, or a program. Any domain name that is included in the whitelist of benign domain names 122 is removed (at 204) from further consideration by the infected device identification engine 120.

The ensuing tasks refer to operations of the infected device identification engine 120 performed with respect to domain names not on the whitelist of benign domain names 122.

The infected device identification engine 120 determines (at 206) dissimilarities between respective pairs of the domain names transmitted in respective DNS messages by the particular electronic device within a specified time window. The specified time window has a predefined or configurable time duration.

The determination of the dissimilarities (at 206) includes determining a first dissimilarity between a first pair of domain names transmitted by the particular device within the specified time window, determining a second dissimilarity between a second pair of domain names transmitted by the particular device within the specified time window, and so forth.

A dissimilarity between domain names of a pair of domain names can be represented by a dissimilarity metric. The dissimilarity metric can include an edit distance between the domain names, such as a Levenshtein edit distance. An edit distance refers to a number of edit operations to transform a first string to a second string. The edit operations include an insertion of a character in a string, a deletion of a character from a string, and a substitution of a character in a string. As an example, it takes three edit operations to transform "kitten" into "sitting." The three operations include: (1) substituting the first "k" in "kitten" with an "s" to produce "sitten"; (2) substituting the "e" in "sitten" to produce "sittin"; and (3) adding a "g" to the end of "sittin" to produce "sitting."

In other examples, other dissimilarity metrics can be used to represent dissimilarities between domain names.

Moreover, although reference is made to determining a dissimilarity between domain names in each pair of multiple pairs of domain names, techniques or mechanisms according to some implementations of the present disclosure can more generally be applied to examples where a dissimilarity is determined between domain names (two or more) within each group of multiple groups of domain names, where each group of domain names includes two or more domain names.

The infected device identification engine 120 aggregates (at 208) the determined dissimilarities of the respective pairs of domain names transmitted by the particular electronic device within the specified time window. The aggregating of the determined dissimilarities derives an aggregate value that provides an overall measure of dissimilarity among the domain names (not on the whitelist 122) transmitted by the particular device within the specified time window. The aggregating (at 208) can aggregate the dissimilarity metrics, such as by computing an average, a mean, a median, a sum, or any other combined value. For example, the aggregating of edit distances can produce an average edit distance.

In some examples, prior to performing the aggregating of the dissimilarity metrics, the infected device identification engine 120 normalizes (at 210) dissimilarity metrics with respect to lengths of domain names, to reduce or prevent a bias towards longer domain names. For example, for longer domain names, a larger number of edit operations are performed to change from a first domain name to a second domain name. Normalizing a dissimilarity metric with respect to lengths of domain names can involve dividing the dissimilarity metric by the length of a domain name (or the average length of the multiple domain names in a pair or other group of domain names). The aggregating of dissimilarity metrics can then be an aggregate of the normalized dissimilarity metrics to derive the aggregate value.

The infected device identification engine 120 compares (at 212) the aggregate value derived by aggregating the (normalized) dissimilarity metrics to an infected device threshold 124 for determining whether the electronic device is infected with malware that produces DGA domain names.

In response to determining (at 214) that the aggregate value exceeds the threshold, the infected device identification engine 120 identifies (at 216) the electronic device as malware infected. The identifying of the electronic device as malware-infected can include identifying a network address (e.g., an IP address) of the electronic device as malware-infected.

In response to determining (at 214) that the aggregate value does not exceed the threshold, the infected device identification engine 120 does not identify the electronic device as malware-infected.

Information pertaining to a malware-infected electronic device, as identified by the infected device identification engine 120, can be provided to a remediation engine 126, which can take action to address the malware-infected electronic device. Information relating to a malware-infected electronic device can include any or some combination of the following: a network address of the electronic device, a name of the electronic device, a location of the electronic device, an owner of the electronic device, information pertaining to the malware that has infected the electronic device, and so forth.

Remediation actions that can be performed by the remediation engine 126 can include any or some combination of the following: blocking the malware-infected electronic device from accessing the network 106, disabling the malware-infected electronic device (such as by shutting it down), performing a malware cleaning process on the malware-infected electronic device, sending an alert to an administrator or other user, and so forth.

In other examples, the remediation engine 126 can be omitted, with the infected device identification engine 120 sending an alert to an administrator or other user regarding an identified malware-infected electronic device.

More generally, the infected device identification engine 120 can provide information of an identified malware-infected device to a target, where the target can include the remediation engine 126 or an administrator.

Although FIG. 1 shows the DNS message logger 112, infected device identification engine 120, and remediation engine 126 as being separate nodes, it is noted that in other examples, some combination or all of the logger 112 and engines 120, and 126 can be part of a common computing node, where a "computing node" can refer to computer or an arrangement of multiple computers.

Figure 3:
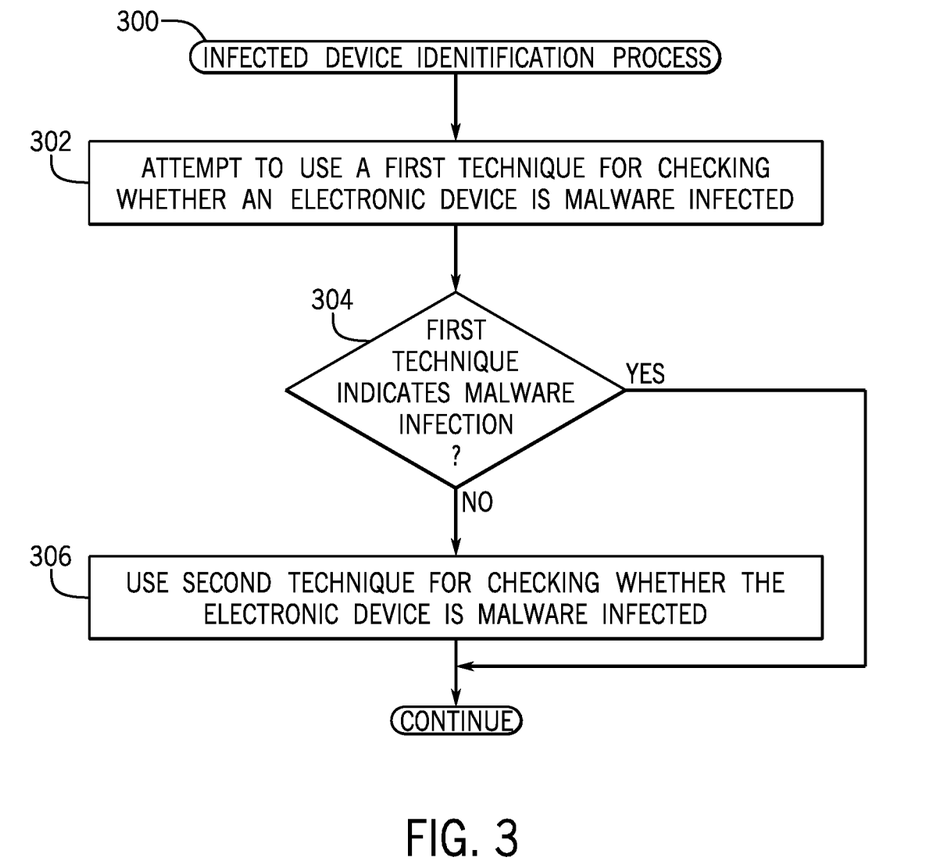

FIG. 3 is a flow diagram of an infected device identification process 300 according to alternative implementations.

The infected device identification process 300 attempts (at 302) to use a first technique for checking whether an electronic device is malware infected. The first technique can be a less computational intensive technique than the infected device identification process 200 of FIG. 2, for example. Further details of the first technique are discussed below.

The infected device identification process 300 determines (at 304) whether the first technique indicates malware infection of the electronic device. If so, then the infected device identification process 300 returns, since malware infection of the electronic device has been detected using a computationally less intensive technique.

If the first technique does not indicate malware infection of the electronic device, the infected device identification process 300 performs (at 306) a second technique for checking whether the electronic device as malware infected. In some examples, the second technique is the infected device identification process 200 of FIG. 2.

Thus, using the infected device identification process 300 of FIG. 3 according to some examples, a less computationally intensive technique for determining whether an electronic device is malware infected is first applied. If the less computationally intensive technique does not indicate that an electronic device is malware infected, then the infected device identification process 200 can be applied to confirm whether or not the electronic device is malware infected. Alternatively, for reduced latency in identifying malware-infected devices, the different techniques for identifying infected devices can be performed in parallel. If the first technique identifies a malware-infected device, then the second technique can be terminated. However, if the first technique does not identify a malware-infected device, the second technique can be allowed to complete. An administrator can decide whether to execute the first and second techniques in sequence or in parallel.

Different examples of the first technique are discussed below.

In a first example, the first technique can use detection of n-grams that do not appear in words of a given language (such as English or a different language) in a domain name for ascertaining whether domain names are DGA generated, and based on such detection of DGA domain names, determining whether an electronic device that transmitted the DGA domain names is malware infected. Each n-gram includes a sequence of n letters. In some examples, n≥2. In other examples, n>2. If n=2, then the n-gram is referred to as a bigram. If n=3, then the n-gram is referred to as a trigram. The n-gram based first technique compares a value derived from a number of the identified n-grams to a threshold, and indicates that the domain name is potentially generated by malware in response to the value having a specified relationship (less than, or greater than, equal to, or some predefined relationship) with respect to the threshold. Such an indicated domain name can be referred to as a "DGA domain name." Based on indicated DGA domain names, the n-gram based first technique can determine whether an electronic device that issued the DGA domain names is malware infected.

In a second example, the first technique can use detection of digits in a domain name. Each digit is a number, a symbol, or a character that is not in a language of the domain name. The digit based first technique can count a number of digits in a domain name. The digit based first technique compares a value based on the number of digits to a threshold, and indicates that the domain name is potentially generated by malware in response to the value having a specified relationship (less than, or greater than, equal to, or some predefined relationship) with respect to the threshold. Such an indicated domain name can be referred to as a "DGA domain name." Based on indicated DGA domain names, the digit based first technique can determine whether an electronic device that issued the DGA domain names is malware infected.

Figure 4:
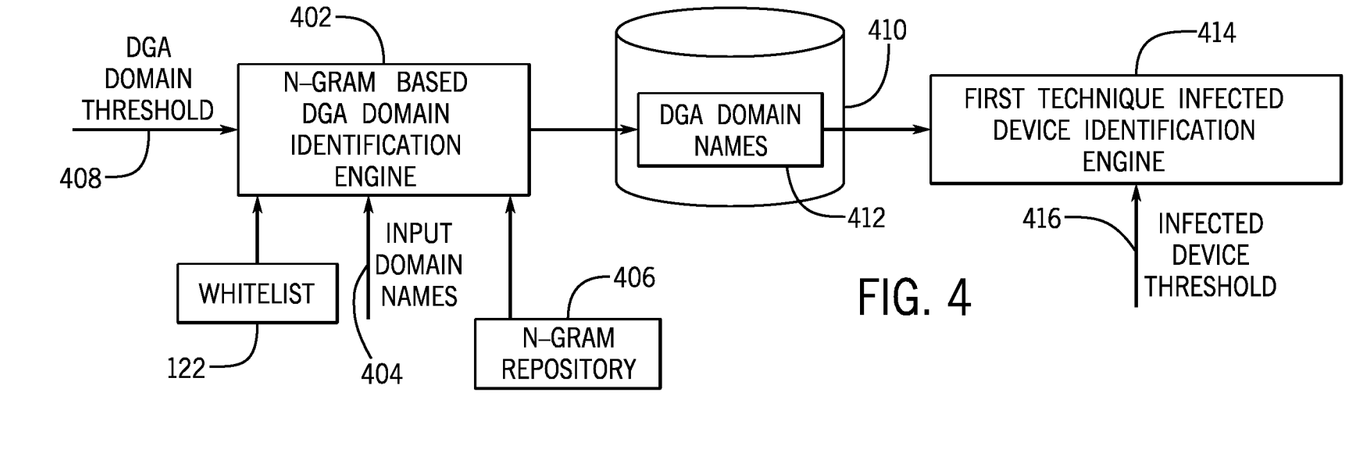
FIGS. 4 and 5 are block diagrams of arrangements including Domain Generation Algorithm (DGA) identification engines and first technique infected device identification engines, according to alternative examples.

FIG. 4 is a block diagram of an example arrangement that implements the n-gram based first technique. An n-gram based DGA domain identification engine 402 can analyze input domain names 404 (such as in DNS messages received over the network 106 (FIG. 1) or retrieved from the log of DNS messages 114), to identify DGA domain names.

To determine whether a domain name in a DNS message is a DGA domain name, the DGA domain identification engine 402 can also consult the whitelist of benign domain names 122, and an n-gram repository 406. Any domain name that is included in the whitelist of benign domain names 122 would not be considered further by the DGA domain identification engine 402.

The n-gram repository 406 includes a data structure (e.g., a database, a list, or any other data collection) of n-grams that have been identified as n-grams that do not appear in words of a given language, such as the English language or some other language.

The n-grams in the n-gram repository 406 can be referred to as "forbidden" n-grams." An n-gram is a sequence of n letters where a letter can include an alphabet character, a number, a symbol, or any other type of character. For example, in the domain name "jsgjmbtbdr.com," forbidden trigrams (n-grams with n=3) for the English language are: "jsg", "sgj", "gjm", "jmb", "btb", and "tbd". Any n-gram in a domain name that matches an n-gram in the n-gram repository 406 can be identified as a forbidden n-gram.

The DGA domain identification engine 402 can count a number of n-grams in a domain name. The DGA domain identification engine 402 can use a DGA domain threshold 408 for determining whether a value derived based on the number of n-grams in the domain name is indicative of the domain name being a DGA domain name.

The value derived based on the number of the forbidden n-grams can be one of the following: (1) the number of the forbidden n-grams in the domain name, or (2) a value that is computed by applying a function or expression to the number of the forbidden n-grams. In some examples, a value based on the number of the forbidden n-grams is a fraction computed based on dividing the number of forbidden n-grams by the total number of n-grams in the domain name. In other examples, other values can be computed based on the number of forbidden n-grams.

Any DGA domain name identified by the DGA domain identification engine 402 can be stored in a storage medium 410. As depicted in FIG. 4, the storage medium 410 includes DGA domain names 412 identified by the DGA domain identification engine 402. The storage medium 410 includes a storage device (or multiple storage devices).

A first technique infected device identification engine 414 can use the identified DGA domain names 412 and an infected device threshold 416 for determining whether each electronic device (such as the electronic device 102 or 104 of FIG. 1) is infected with malware that produces DGA domain names.

The first technique infected device identification engine 414 determines whether a value based on a number of potentially malware produced messages (DGA messages) generated within a time window by a particular device has a specified relationship (less than, or greater than, equal to, or some predefined relationship) with respect to the infected device threshold 416. A DGA message is a message that contains a DGA domain name, as identified by the DGA domain name identification engine 402.

The value based on the number of DGA messages can equal to a count of the number of DGA messages, or can be based on a value computed based on the number of DGA messages (e.g., a fraction calculated by dividing the number of DGA messages by the total number of messages). The determination of whether messages occur in a time window can be based on timestamps associated with the messages, and the determination of whether messages are transmitted by a particular device can be based on network addresses associated with the messages.

The first technique infected device identification engine 414 identifies the device as potentially infected with malware based on determining that the value based on the number of potentially malware produced messages (DGA messages) produced within the time window by the device has the specified relationship with respect to the infected device threshold 416.

Information pertaining to a malware-infected electronic device, as identified by the first technique infected device identification engine 414, can be provided to a target, such the remediation engine 126 of FIG. 1 or a different target. Also, if an electronic device is not identified as malware infected, then an indication that the electronic device is not identified as malware infected by the first technique can be provided to the infected device identification engine 120 of FIG. 1. In response, the infected device identification engine 120 can apply the infected device identification process 200, for example.

Figure 5:
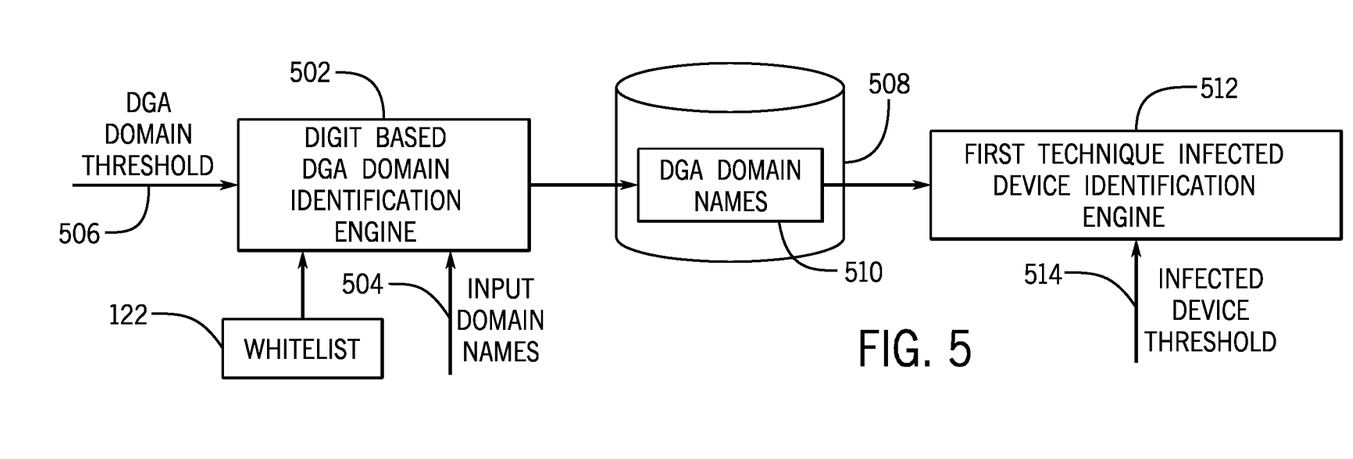

FIG. 5 is a block diagram of an example arrangement that implements the digit based first technique. A digit based DGA domain identification engine 502 can analyze input domain names 504 (such as in DNS messages received over the network 106 (FIG. 1) or retrieved from the log of DNS messages 114), to identify DGA domain names.

To determine whether a domain name in a DNS message is a DGA domain name, the DGA domain identification engine 502 can also consult the whitelist of benign domain names 122. Any domain name that is included in the whitelist of benign domain names 122 would not be considered further by the DGA domain identification engine 502.

The DGA domain identification engine 502 can count a number of digits in a domain name, where each digit is a number, a symbol, or a character that is not in a language of the domain name. For example, in the domain name "15xy299e*555h.com," the number of digits is 9 (1, 5, 2, 9, 9, *, 5, 5, 5). As another example, in the domain name "x7z4ΔλṄ2abc.org," the number of digits is 6 (7, 4, Δ, λ, Ṅ, 2). In the latter example, it is assumed that the domain name is in the English language, and thus the digits Δ, λ, and Ṅ (in addition to the numbers) are not considered to be English language characters.

The DGA domain identification engine 502 can use a DGA domain threshold 506 for determining whether a value derived based on the number of digits in the domain name is indicative of the domain name being a DGA domain name.

The value derived based on the number of the digits can be one of the following: (1) the number of the digits in the domain name, or (2) a value that is computed by applying a function or expression to the number of the digits. In some examples, a value based on the number of the digits is a fraction computed based on dividing the number of digits by the total number of characters (including digits and non-digits) in the domain name. In other examples, other values can be computed based on the number of digits.

Any DGA domain name identified by the DGA domain identification engine 502 can be stored in a storage medium 508. As depicted in FIG. 5, the storage medium 508 includes DGA domain names 510 identified by the DGA domain identification engine 502. The storage medium 508 includes a storage device (or multiple storage devices).

A first technique infected device identification engine 512 can use the identified DGA domain names 510 and an infected device threshold 514 for determining whether each electronic device (such as the electronic device 102 or 104 of FIG. 1) is infected with malware that produces DGA domain names. The first technique infected device identification engine 512 can apply the same process as the first technique infected device identification engine 414 of FIG. 4, in some examples.

In other examples, a first technique to determine whether a device is malware infected can use both the n-gram based first technique and the digit based first technique.

Each of the infected device threshold 124 (FIG. 1), DGA domain threshold 408 (FIG. 4), DGA domain threshold 506 (FIG. 5), infected device threshold 416 (FIG. 4) and infected device threshold 514 (FIG. 5) can be predefined or can be computed based on input information.

Each threshold can be one of: (1) a global threshold that is common for different users or groups of users, or (2) an individual threshold tailored to a user or group of users.

In examples where the threshold is computed, a system can determine true positive rates and false positive rates for respective different thresholds.

For computing a DGA domain threshold (e.g., 408 or 506), a collection of known DGA domain names and a collection of known benign domain names can be supplied to the system, such as the system shown in FIG. 4 or 5. For each of different values of the DGA domain threshold tested, the output of the DGA domain identification engine 402 or 502 that processes the collection of known DGA domain names and the collection of known benign domain names can be examined. Statistical analysis of the output can produce a true positive rate of the DGA domain identification engine 402 or 502, which is the rate at which the DGA domain identification engine 402 or 502 correctly identified a DGA domain name as a DGA domain name. The statistical analysis can also produce a false positive rate, which is the rate at which the DGA domain identification engine 402 or 502 identified a DGA domain name as a benign domain name.

Based on the true positive rate and false positive rate (or any other statistical measure produced by the statistical analysis) for DGA domain name detection, the system can select from among the different values of the DGA domain threshold based on comparing the true positive rates and the false positive rates for the respective different threshold values.

The true positive rate and false positive rate of the output produced by the infected device identification engine (120, 414, or 512) can similarly be computed using a collection of malware-infected devices and a collection of non-malware-infected devices, with a comparison of the true positive rates and false positive rates for malware-infected device identification of the respective different values of the infected device threshold used to select a value of the infected device threshold.

By using techniques or mechanisms according to some implementations, timely and reliable detection of DGA domain names and malware-infected devices can be achieved. By being able to detect a malware-infected device early, a security action can be taken to prevent the malware-infected device from establishing a communication with a C2 server. Also, by being able to detect a DGA domain name early, a security action can be taken to block a response to a DNS message that includes the DGA domain name, and further, to identify the device that issued the DNS message including the DGA domain name.

Figure 6:
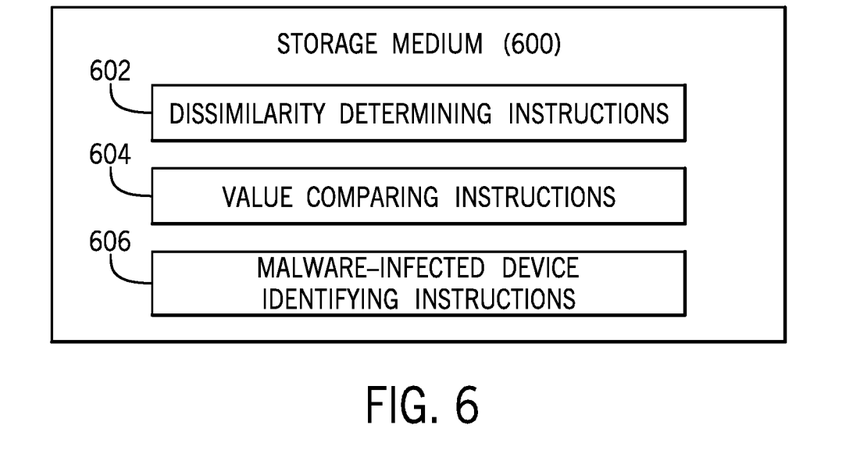
FIG. 6 is a block diagram of a storage medium storing machine-readable instructions according to further examples.

FIG. 6 is a block diagram of a non-transitory machine-readable or computer-readable storage medium 600 storing machine-readable instructions that upon execution cause a system to perform various tasks for a device that transmitted domain names in messages, such as DNS messages. The machine-readable instructions include dissimilarity determining instructions 602 to determine a dissimilarity between the domain names. The machine-readable instructions further include value comparing instructions 604 to compare a value derived from the determined dissimilarity to a threshold. The machine-readable instructions also include malware-infected device identifying instructions 606 to identify the device as malware infected in response to the comparing.

Figure 7:
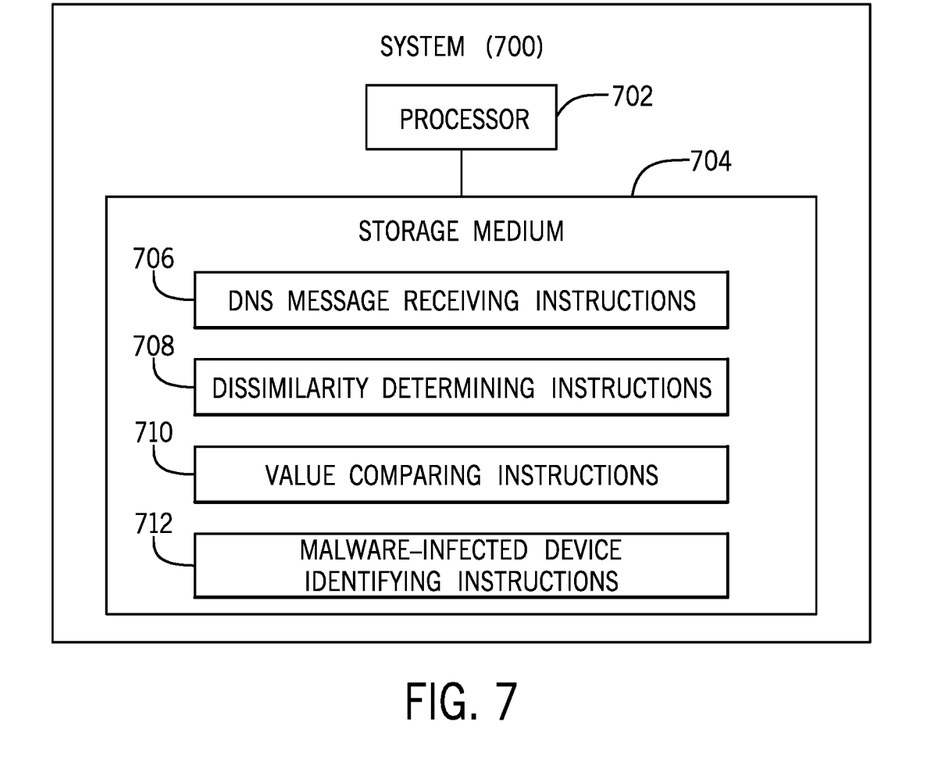
FIG. 7 is a block diagram of a system according to other examples.

FIG. 7 is a block diagram of a system 700 including a processor 702 (or multiple processors). A processor can include a microprocessor, a core of a multi-core microprocessor, a microcontroller, a programmable integrated circuit, a programmable gate array, or another hardware processing circuit.

The system 700 further includes a non-transitory storage medium 704 storing machine-readable instructions executable on the processor 702 to perform various tasks. Machine-readable instructions executable on a processor can refer to machine-readable instructions executable on a single processor or on multiple processors.

The machine-readable instructions include DNS message receiving instructions 706 to receive DNS messages including respective domain names, the DNS messages transmitted by a device. The machine-readable instructions further include dissimilarity determining instructions 708 to determine dissimilarities between respective groups (e.g., pairs) of the domain names. The machine-readable instructions also include value comparing instructions 710 to compare a value derived from the determined dissimilarities (such as by aggregating dissimilarity metrics representing the dissimilarities) to a threshold (e.g., 124 in FIG. 1). The machine-readable instructions additionally include malware-infected device identifying instructions 712 to identify the device as malware infected in response to the comparing.

Figure 8:
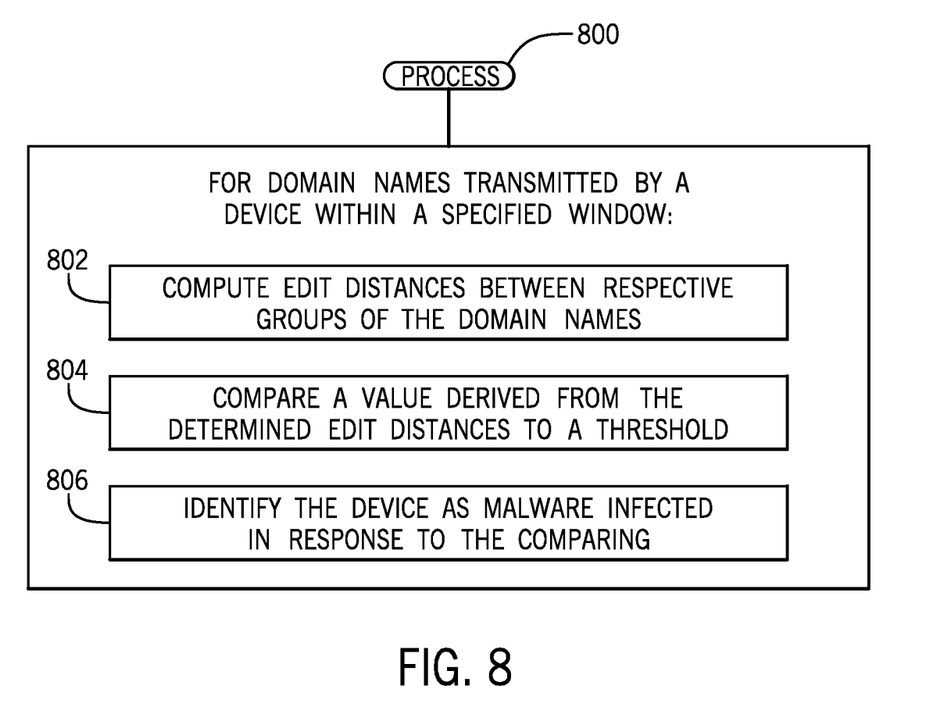
FIG. 8 is a flow diagram of a process according to additional examples.

FIG. 8 is a flow diagram of a process 800 according to some examples, which can be performed by the infected device identification engine 120. The process 800 includes, for domain names transmitted by a device within a specified time window: computing (at 802) edit distances between respective groups of the domain names, comparing (at 804) a value derived from the determined edit distances to a threshold, and identifying (at 806) the device as malware infected in response to the comparing.

The storage medium 600 (FIG. 6) or 704 (FIG. 7) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
for a device that transmitted domain names in messages:
determine a dissimilarity between the domain names;
compute a threshold based on determining true positive rates and false positive rates of a malware infected device identification for respective different thresholds;
select the threshold from among the respective different thresholds based on comparing the true positive rates and the false positive rates for the respective different thresholds;
compare a value derived from the determined dissimilarity between the domain names to the threshold;
identify the device as malware infected in response to the comparing; and
perform a remediation action on the device identified as malware infected.

2. The non-transitory machine-readable storage medium of claim 1, wherein the domain names were transmitted in the messages within a specified time window, and the domain names are part of a first group of the domain names, and wherein the instructions upon execution cause the system to further:
determine a further dissimilarity between a second group of the domain names within the specified time window; and
derive the value further based on the further dissimilarity between the second group of the domain names.

3. The non-transitory machine-readable storage medium of claim 2, wherein the deriving the value further based on the further dissimilarity comprises aggregating a dissimilarity for the first group of the domain names and the further dissimilarity between the second group of the domain names.

4. The non-transitory machine-readable storage medium of claim 3, wherein the aggregating comprises averaging the dissimilarity for the first group of the domain names and the further dissimilarity between the second group of the domain names.

5. The non-transitory machine-readable storage medium of claim 1, wherein the determined dissimilarity between the domain names comprises an edit distance between the domain names.

6. The non-transitory machine-readable storage medium of claim 1, wherein the determining comprises:
computing a dissimilarity metric that represents the determined dissimilarity between the domain names; and
normalizing the dissimilarity metric for lengths of the domain names.

7. The non-transitory machine-readable storage medium of claim 1, wherein the determining, the comparing, and the identifying are performed for a source network address of the device, and the identifying comprises providing the source network address to a target.

8. The non-transitory machine-readable storage medium of claim 1, wherein the instructions upon execution cause the system to further:
receive respective domain name system (DNS) messages containing the domain names,
wherein the determining, the comparing, and the identifying are performed in response to the receiving the respective DNS messages.

9. The non-transitory machine-readable storage medium of claim 1, wherein the instructions upon execution cause the system to further:
determine whether the domain names are included in a whitelist of benign domain names, wherein the determining, the comparing, and the identifying are performed in response to the domain names not being included in the whitelist of benign domain names.

10. The non-transitory machine-readable storage medium of claim 1, wherein the instructions upon execution cause the system to further:
attempt to use a first technique for checking whether the device is malware infected; and
in response to the first technique not indicating the device as malware infected, perform a second technique for checking whether the device is malware infected, wherein the second technique includes the determining, the comparing, and the identifying.

11. The non-transitory machine-readable storage medium of claim 10, wherein the first technique comprises:
   identifying, in a given domain name, n-grams that do not appear in words of a given language, where n is greater than or equal to two;
   comparing a given value based on a number of the identified n-grams to a given threshold;
   indicating that the given domain name is potentially generated by malware in response to the given value having a specified relationship with respect to the given threshold; and
   attempting to determine whether a device that transmitted the given domain name is malware infected based on the indication that the given domain name is potentially generated by malware.

12. The non-transitory machine-readable storage medium of claim 10, wherein the first technique comprises:
   counting a number of digits in a given domain name;
   comparing a given value based on the number of digits to a given threshold;
   indicating that the given domain name is potentially generated by malware in response to the given value having a specified relationship with respect to the given threshold; and
   attempting to determine whether a device that transmitted the given domain name is malware infected based on the indication that the given domain name is potentially generated by malware.

13. The non-transitory machine-readable storage medium of claim 1, wherein the instructions upon execution cause the system to further:
   attempt to use a first technique for checking whether the device is malware infected; and
   perform, in parallel, a second technique for checking whether the device is malware infected, wherein the second technique includes the determining, the comparing, and the identifying.

14. The non-transitory machine-readable storage medium of claim 1, wherein the threshold is one of:
   a global threshold that is common for different users or groups of users, or
   an individual threshold tailored to a user or group of users.

15. A system comprising:
   a processor; and
   a non-transitory storage medium storing instructions executable on the processor to:
      receive domain name system (DNS) messages including respective domain names, the DNS messages transmitted by a device; determine dissimilarities between groups of the respective domain names;
      compute a threshold based on determining true positive rates and false positive rates of a malware infected device identification for respective different thresholds;
      select the threshold from among the respective different thresholds based on comparing the true positive rates and the false positive rates for the respective different thresholds;
      compare a value derived from the determined dissimilarities to the threshold;
      identify the device as malware infected in response to the comparing; and
      perform a remediation action on the device identified as malware infected.

16. The system of claim 15, wherein the instructions are executable on the processor to determine whether the respective domain names are in a whitelist of benign domain names, and wherein the determining, the comparing, and the identifying are performed for domain names not included in the whitelist of benign domain names.

17. The system of claim 15, wherein the
   remediation action includes a security action taken with respect to the device.

18. A method executed by a system comprising a processor, comprising:
   for domain names transmitted by a device within a specified time window:
      determine dissimilarities between respective groups of the domain names, including computing edit distances between the respective groups of the domain names;
      compute a threshold based on determining true positive rates and false positive rates of a malware infected device identification for respective different thresholds;
      select the threshold from among the respective different thresholds based on comparing the true positive rates and the false positive rates for the respective different thresholds;
      comparing a value derived from the computed edit distances to the threshold; and
      identifying the device as malware infected in response to the comparing; and
      performing a remediation action on the device identified as malware infected.

19. The method of claim 18, wherein the domain names are transmitted in respective domain name system (DNS) messages.

20. The method of claim 18, wherein the threshold is one of:
   a global threshold that is common for different users or groups of users, or
   an individual threshold tailored to a user or group of users.

* * * * *